United States Patent Office

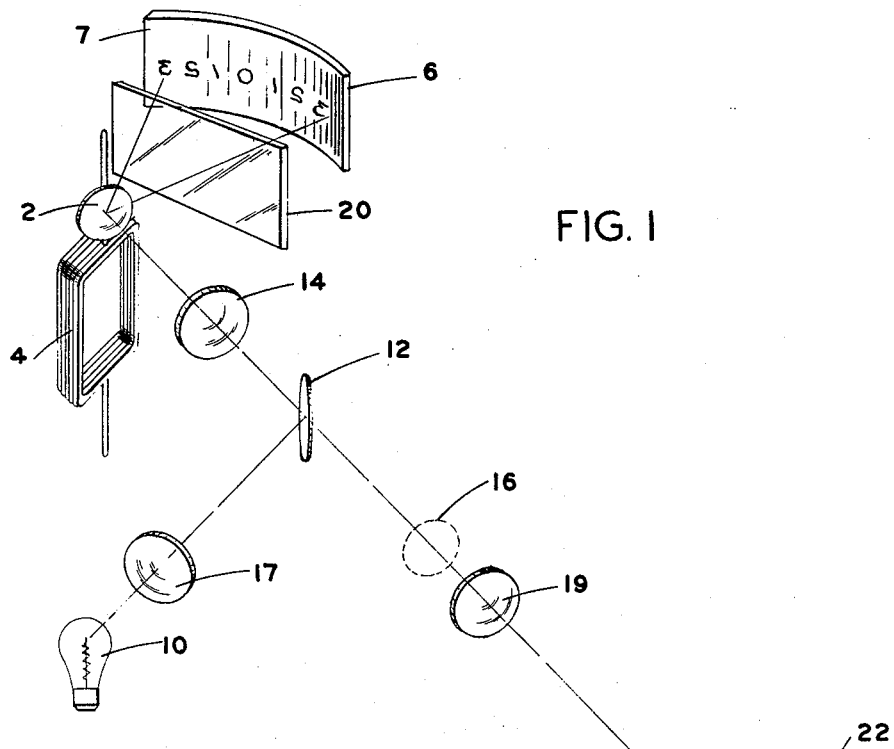
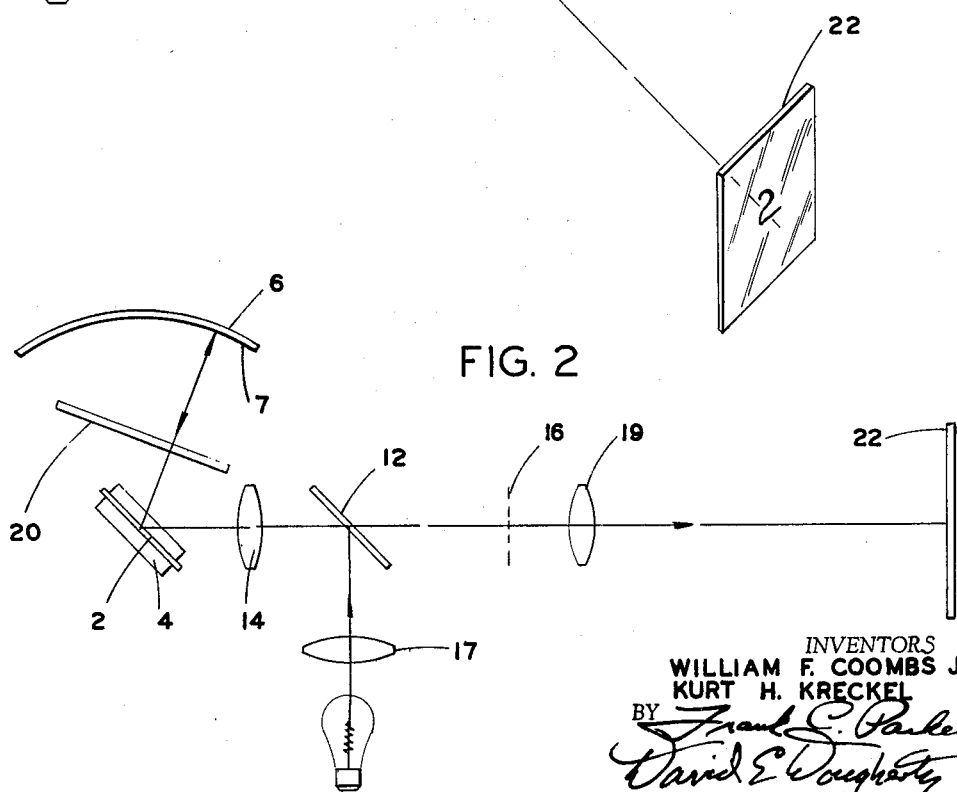
INVENTORS
WILLIAM F. COOMBS JR.
KURT H. KRECKEL
ATTORNEYS

3,205,768
Patented Sept. 14, 1965

3,205,768
OPTICAL ELEMENT
William F. Coombs, Jr., Irondequoit, and Kurt H. Kreckel, Fairport, N.Y., assignors to Bausch & Lomb Incorporated, Rochester, N.Y., a corporation of New York
Filed Sept. 18, 1962, Ser. No. 224,321
1 Claim. (Cl. 88—24)

This invention relates to a novel optical element and more particularly to a novel optical element which optically compensates for non linearity in a meter.

Optical read out systems have been developed for use with galvanometers or the like for indicating angular displacements. Systems of this type generally include a small mirror mounted in fixed relation to a movable element or coil. Any deflection of a light beam reflected from the mirror are observed to indicate changes in angular displacement. For example, changes in a galvanometer would indicate changes in electrical values.

One system of this type is disclosed in the copending application of Leslie O. Vargady, Serial No. 149,646 filed November 2, 1961, now Patent No. 3,114,284, and assigned to the same assignee as the present application. The Vargady system includes a cylindrical scale which indicates angular displacement instead of a tangent function which would be indicated by a linear scale. The use of the cylindrical scale also facilitates maintaining the optical system in focus.

The improvements in the aforementioned application lead to an additional problem. That problem was brought about by the improved optical accuracy which magnifies any inaccuracies in an electrical meter. Presently available electric meters normally include a non linearity characteristic. The non linearity relates to the fact that the changes in displacement are not exactly proportional to the changes in values. Accordingly they are rated as either 1% linearity or 0.1% linearity meters. The price differential between the more accurate meters and the relatively inferior meters is substantial and in some cases prohibits incorporating the relatively expensive meter in a device.

In order to meet commercial demands it appears highly desirable to produce an optical system which includes optical compensating means for overcoming the non linearity in a meter. Advantageously the present invention incorporates optical compensating means for overcoming the nonlinearity in a meter. The compensating means may be readily adapted to many presently available systems at a relatively low cost and is relatively durable in use.

Optical compensating means for calibrating a meter and read out system may be added during the manufacture of the device or it may be added subsequently. This feature facilitates manufacturing a relatively accurate instrument which may be marketed at a relatively low cost. In other cases the recalibration of the device may be readily achieved.

While the present invention is particularly applicable to a galvanometer read out system such as the one disclosed in the aforementioned Vargady application, it is also applicable to any system which includes a meter for indicating angular displacements. Such meters might indicate changes in pressure, temperature, voltage, current, volume, resistivity, angular movement, etc.

Briefly, the present invention contemplates a combination of a meter which is responsive to a variable, and an optical read out system for indicating the position of the meter. The combination also includes means for optically compensating for the non linearity in the meter.

The invention will now be described in more detail in connection with the accompanying drawings; in which, FIG. 1 is a perspective view somewhat schematic of an optical system including means for optically compensating for non linearity in an electric meter; and FIG. 2 is a top view illustrating the optical system and compensating means shown in FIG. 1.

A galvanometer read out system according to the present invention includes a rotatable mirror 2 fixed to a rotatable member 4. The member 4 shown in FIGS. 1 and 2 is a moving coil of the type used in conventional galvanometers. A concave cylindrical scale 6 is arranged so that the radius of curvature is equal to the distance from the scale to the axis of rotation of the mirror, i.e. the origin of the generatrix lies on the axis of rotation. The front surface of the scale has a reflective surface, i.e. a coating, polished metal, or a transparent scale with a reflective background. The latter is considered to be a reflective scale.

A light source 10 and a beam splitter 12 are arranged to project a beam of light onto mirror 2. The light beam is reflected by the mirror 2 onto the cylindrical scale 6. The reflective surface 7 of the scale 6 reflects the light beam back by way of the rotatable mirror 2 through an image forming element 14 through the beam splitter 12 to an image plane 16.

The light rays pass through the optical compensating means or element 20 which displaces the ray in order to compensate for non linearity in the meter. The element 20 illustrated comprises a plane parallel plate which displaces the beam according to Snell's law. In other cases it may be desirable to include a curved element such as a lens. The plane parallel plate is disposed perpendicular to an incident light ray passing from the mirror to an extreme portion of the scale.

The primary purpose of the element 14 is to project an image of the scale to the image plane 16. The element 14 preferably a lens is also an integral part of the illumination system which produces optimum illumination of an area of the scale. In some cases it may be desirable to include a separate condenser lens 17. In such case the condenser lens 17 could be placed between the light source 10 and the beam splitter 12.

A projection lens 19 may be incorporated in the system for magnifying the image of the illuminated portion of the scale 6. An intermediate aerial image is formed at the first image plane 16 and the projected or magnified image is formed on the screen 22. In this case an intermediate aerial image is formed by the element 14.. The intermediate image is projected through the lens 19 with the desired magnification onto the screen 22.

An example of the optical compensating means according to a presently preferred embodiment of the invention comprises a plane parallel plate. The plate displaces a light ray according to Snell's law. Accordingly the angle of incidence of a light ray, thickness of the plate and index of refraction should be considered in selecting a compensating element.

The presently preferred embodiment includes a glass plate having an index of refraction $n_D = 1.5$ and a thickness equal to ½ mm. This element is used in conjunction with the optical read out system disclosed hereinabove in which the scale radius of curvature is 40 mm., and scale length is 28 mm. The plane parallel plate is disposed perpendicular to an incident light ray passing from the mirror to the maximum deviation indicated. This arrangement provides no correction at that extreme portion of the scale, however, provide ½% correction at the opposite extreme when the angle of incidence equals 40°.

For a maximum angle of incidence $i_1$ equal to 40° this plate will provide a ½% correction. Calculations to determine the correction are based on the formula $$d = t \sin \frac{(i_1 - i_2)}{\cos i_2}$$

and $$\sin i_2 = \frac{n_1}{n_2} \sin i_1$$

wherein $d$=displacement, $t$=thickness of plate, $i_1$=angle of incidence, $i_2$=angle of refraction, $n_D$=index of refraction of the material. From the above it is possible to select a suitable optical compensating means for overcoming a relatively large number of variables.

In some cases the compensating means may take the form of a lens. In such a case the deviating properties may be calculated according to the principles of lens design. In other cases it may be desirable to compensate for non linearity in a selected portion of the scale or to incorporate different optical compensating elements for different portions of a scale.

What is claimed is:

In combination a meter responsive to an electrical input, and an optical system including a rotatable mirror which rotates in response to the variations in the electrical input, a concave scale and a screen, means including a light source projecting a beam of light by way of said rotatable mirror onto said concave scale, said scale retrodirecting the beam of light, an optical image forming element disposed on the optical axis of the system between said scale and said screen forming an image of an illuminated portion of said scale on said screen, and a relatively flat transparent plate disposed between said scale and said rotatable mirror compensating for non linearity in said meter.

References Cited by the Examiner

UNITED STATES PATENTS

| 2,347,702 | 5/44 | Maris | 116—114.13 |
| 2,554,679 | 5/51 | Mitchell | 88—24 |
| 2,854,628 | 9/58 | Te Gude | 88—24 |
| 2,941,443 | 6/60 | McNally | 88—14 |

FOREIGN PATENTS 626,642   7/49   Great Britain.

JULIA E. COINER, *Primary Examiner.*
EMIL G. ANDERSON, *Examiner.*